April 10, 1962
T. F. PETERSON
3,028,971
STRAINER TUBE HAVING ENVELOPE OF PLURAL
HELICALLY PREFORMED ELEMENTS
Filed July 24, 1959
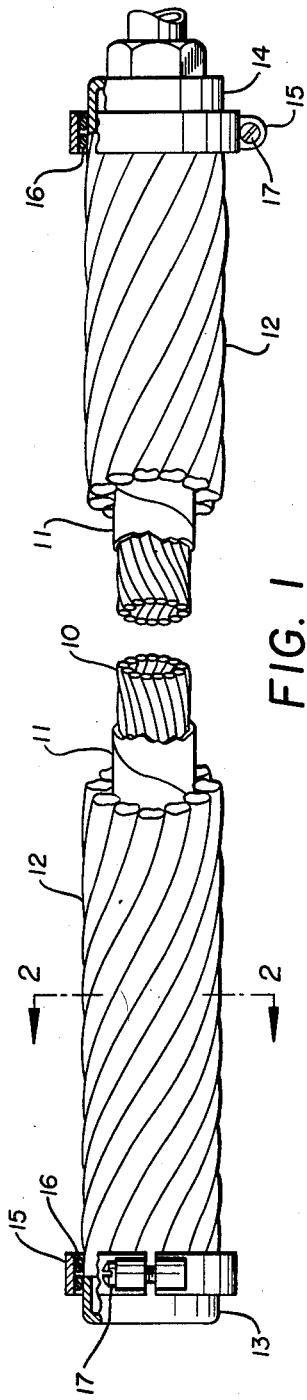
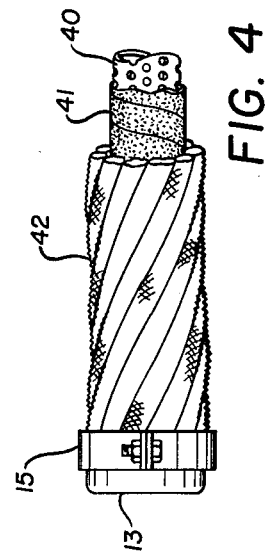
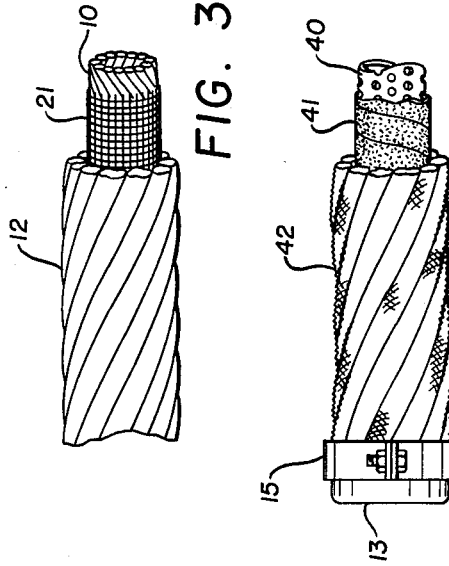
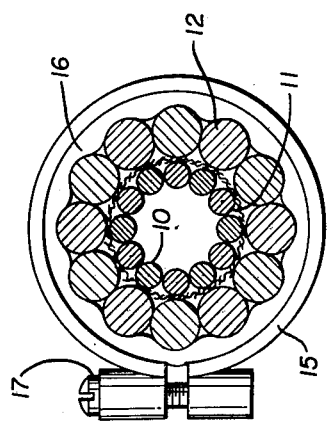
INVENTOR.
THOMAS F. PETERSON
BY
*Richard H. MacCutcheon*
ATTORNEY

United States Patent Office 3,028,971
Patented Apr. 10, 1962

3,028,971
STRAINER TUBE HAVING ENVELOPE OF PLURAL
HELICALLY PREFORMED ELEMENTS
Thomas F. Peterson, 23450 Laureldale Road,
Shaker Heights, Ohio
Filed July 24, 1959, Ser. No. 829,343
8 Claims. (Cl. 210—484)

This application is a continuation-in-part of my copending application Serial No. 687,202, filed September 30, 1957, now abandoned, for Strainer Tubes of Preformed Elements. Like that application, the present application relates to strainers and filters and has particular significance in connection with novel easily removable pressure restraint means, and like the invention of the prior application this invention stems from those disclosed in my prior Patent Nos. 2,275,019; 2,587,521; 2,736,398; 2,744,707; 2,761,273, and others.

In the past it has been known to have alternate filter bags and plates located in a press so that, as in the manufacture of pottery or of porcelain electrical insulators, the individual bags may be filled with a wet clay and a substantial part of the moisture squeezed therefrom by exerting pressure upon the assembly of bags and plates as by turning a wheel. During operation of such conventional apparatus it has been found difficult to eject the squeezed clay compacts from the bags, difficult to clean clay out of the pores of the bags between squeezings, and time-consuming and costly to tear down the whole press in order to get solids removed from the filter cloth. Many filtering processes to date have very definitely been batch type in essence and usually require tearing down the machine in order to get solids removed.

I am aware of pre-existing techniques where tubular filters have been made with a single and continuous and wrapped on soft tape or yarn or braid, or even with a steel wire still of a continuous length and with its helical turns wrapped on in contiguous relation to each other as in expired Patent 1,279,611 to Timmins, or with a flat metal ribbon wrapped on something as a continuous length forming contiguous turns with a pitch much less than the helix diameter as in the filter construction of expired Patent 2,042,537 to Liddell.

I have found that such single continuous wrappings are laborious to put on and laborious or impossible to remove for cleaning, or thereafter reapply.

It is an object of the present invention to provide simple and inexpensive means for overcoming the above-mentioned difficulties.

In broad aspect, the present invention is a filter in which by means of differential pressure from one (inner or outer) side of a tubular structure to the other, a fluid is filtered by passing radially from a hollow cylindrical body through a cylindrical filter means (such as paper, filter cloth, screening, etc.) which is held to the core piece by means of a layer of plural side-by-side nested helical elements each of a form maintaining material and each preformed in an open helix and with a pitch and opening between turns of the order of several times the diameter of the helix and, preferably, preformed to an inner diameter less than the outer diameter of the filter means. When internal pressure is applied, the helical elements, preformed to a diameter less than the diameter of the filter material, bear against the filter material with a pressure dependent on the initial I.D. of the helical elements as compared with the O.D. of the cylindrical filter material. While there is a slight opening between elements, resulting from this internal pressure, it does not cause undue spaces to develop between the helical elements through which the filter means might have a tendency to blow out. End retaining clamps or glands are used to assist in preventing such action, but an important feature of the present invention is that the strainer tube may be readily assembled and just as readily disassembled for cleaning or replacement of the filter material and the whole thing can be done quite expeditiously and economically.

An important difference between the present invention and prior constructions is that according to the invention the preformed elements are in contiguous relation with one another (rather than in contiguous relation with different turns of the same single piece as in prior constructions where the pitch or advance per turn is only the material width or much less than on the order of several times the diameter of the helix so as to provide only a "hoop" strength without taking care of longitudinal tensile stresses). Another important difference over the prior art is that with a preferred embodiment the elements are preformed to a diameter less than that of the material which they hug.

Other objects and advantages will become apparent and the invention may be better understood from consideration of the following description taken in connection with the accompanying drawing, in which:

FIG. 1 is a side elevation part cut away and showing a filter element made according to one aspect of the present invention;

FIG. 2 is a cross sectional view taken along the line 2—2 of FIG. 1;

FIG. 3 shows a modification using wire screening as a filter material; and

FIG. 4 shows another modification.

Referring now to FIG. 1 I have shown cut away end portions of a continuous filter in which, by means of differential pressure for example from the inside to the outside, a fluid is filtered by passing radially from within an inner hollow cylindrical pervious walled supporting body 10 out through, for example, wrapped on filter paper 11, which is thus also cylindrical, with the filter paper held to the core piece by means of an outer envelope which is a layer of plural preformed helical elements 12. The outer elements 12 are held somewhat against longitudinal movement by means of end nuts, glands, etc., and in the illustrated embodiment each end is shown enclosed by an end fitting 13, 14, respectively, while at each end a split ring clamp 15 encircles sealing or O rings 16. By closing the clamps pressure is exerted upon the O rings and upon the ends of the elements 12 and also upon the end fittings such as 13 which with clamp 15 serves as a removable enclosure about the resilient material elements at one end of the strainer tube or filter, and such as 14 which with its clamp 15 serves as a process material introducing means at the other end of the tube, the split rings being drawn together as by threaded engagement of a tightening screw 17.

Each element 12 made as an open helix for use in accordance with the invention requires but limited resilience, and the extent to which it requires bending for application when enclosing a filter depends on its pitch and its width. It is only necessary that the range of bending movement or distortion necessary for its application from the side does not stress the material beyond the elastic limit or yield point of the material used, and the stress induced may be brought within the elastic limit of many materials by giving the helix a sufficient pitch which amounts to about the same thing as saying that there is sufficient width of helical opening or gap at the time that only a single element has been applied. Materials that are relatively rigid as compared with wrappings and permanently retain a helical formation previously imparted are used and the words "form-maintaining" are hereafter used to described them, and as already stated, the pitch is several times the helix diameter and preferably the inside diameter of the helical preform is less than the outside diameter of the filter means for which the elements serve as an envelope.

Each element 12 is applied, for example about a filter cloth which is in turn supported about an inner foraminous tube, and each preformed element may be applied by engaging the filter cloth or paper, etc., with one end and revolving the other end of the element around the cloth without rotation until the element encloses the cloth but, unlike ordinary wrapped-on materials, with a very substantial opening between turns. The remaining helical gap which exposes portions of the cloth is enclosed by applying other like elements each in the same manner, the number required for complete closing of the gap depending on the pitch and width of the individual elements. Alternatively, the elements may be applied plurally by groups (as in Runde Pat. 2,582,797). In either event, there is first put on a part-lay (of one or more elements) and then one or more additional part-lays are intertwisted to finally close up the gap provided by the openings between turns of the first part-lay.

As seen in FIG. 1, and in FIG. 2 which is a cross section along the line 2—2 of FIG. 1, the inner body 10 may also be made up of elements each separately preformed as a helix with a pitch and opening between turns of several times the diameter of the helix with the separate uniformly sized elements later being assembled together as already described to make a more or less solid but permeable walled tubular structure.

In FIG. 3 there is shown a modification in which the final arrangement of concentric tubes again has an inner tube 10 assumed made of plural helically preformed elements, while thereabout is a tube of screen wire 21 arranged to serve as a filtering means, and about the filtering means there is again an outer envelope of plural helically preformed elements 12.

In the arrangement of FIG. 4 there is an inner perforate metal tube 40, an intermediate wrapping 41 which may be assumed to be of steel wool, and an outer bundle of helically individually preformed rods 42 inter-associated in contiguous coaxial relation although in this embodiment the helical elements of the outer envelope have small radial slots created between them by pre-knurling of each helical element. Such means or other means such that openings are created between the otherwise contiguous helical elements could be introduced either before or after the creation of the original helical preform in each element.

Constructions according to the invention are not limited in usefulness to intermittent operation as strainer tubes or for use in removing liquids from solids for, with proper throttling of outgoing sludge, they can be used almost continuously as strainers, also as filters to separate dirt from a gas, the modification in FIG. 4 in which there is steel wool as the filter material being particularly well adapted to serve as an air filter. Thus with a removable plug 13—15 at one end and with air to be filtered introduced under pressure at the opposite end (not shown) clean air can be derived from around the periphery of the assembly and dirt detained in the steel wool until it is desired to clean the filter at which time it will be easy to remove the outer armor rods, clean and replace the filter material 41, reassemble and again proceed. If desired the inner tube 40 could be of aluminum, 41 could be of aluminum wool (Brillo), and the outer rods 42 could also be of aluminum or other material of high heat conductivity to adapt the assembly to serve as a heat exchange unit in which the outer rods act not only to restrain the filter material but also as radiating fins for efficient heat exchange.

Thus the present invention resides in plural elements, which may be of wire, or rod, or may be flat strips of metal or other suitable form-maintaining material, each preformed as an open helix having an opening between turns and a pitch of several times the diameter of the helix and with such elements each so preformed before application to the other elements in contiguous side by side co-axial and equal diameter relation each with its neighbors.

If there are both inner and outer layers of helically preformed elements (as in FIGS. 1, 2 and 3), I prefer that the outer have a reverse lay with respect to the inner (as shown) although some advantages can be obtained by having the pitch and the lay of the two sets of rods identical with the rods of one fitting into the grooves of the other and the filter material assuming a wave shape in between the two.

In operation, the plural helical elements of the outer envelope act as an effective reinforcing for the inner filtering means to strengthen it and still, all the while, their removal as for cleaning is a relatively simple matter. Such plural outer elements permit manual (rather than machine) application, and manual removal of materials that are too stiff to be applied like a tape, twine, or cord of wrapping, and which still have unlimited possibilities in the development of tensile strength. These plural outer elements, because of the manner in which they are applied, can be applied individually in a confined space where one could not put on a tube, and still, because of their long pitch, they are far superior to ordinary wrappings of contiguous turns of a single element, even if of steel. The inclusion of banding means around the ends of the helically preformed long pitch reinforcements assure that up to any predetermined pressure, as desired for safety, the rods cannot be foreshortened, therefore they cannot expand circumferentially, and this too makes the filter unique and quite different from the side-by-side continuous single wrappings of the past; and a filter according to the present invention is easier to make, easier to maintain, and more efficient in operation since it depends more or less for filter action and reinforcement thereof on variable-by-pressure clearances between solid but deformable and springy preformed reinforcements which are neither substantially peripheral nor substantially longitudinal but, instead, combine the best features of each such direction of reinforcement. That is, with arrangements according to the invention, hoop stress is still a component of the forces resisting blow out of filter material but it is only a component, and there is also a valuable component longitudinally which prevents the envelope of the reinforcements from opening up like the turns of a door spring because the plural helical long pitch elements of the envelope of the invention act as many bridging members providing a strong and stable structure preventing blow out of filter material while all the while amazingly easy to remove compared to prior single wrappings intended for the same general purpose and which for their removal conventionally require cutting, sawing, burning, etc. and which, if of form-maintaining material, would be permanently deformed in any attempted removal which would have to take place off an end rather than from the side. In contrast, the use of plural preformed helical elements permit application and also removal to and from the side of tubular filter material, without exceeding elastic properties of the reinforcement material, and with due regard for longitudinal forces.

There is thus provided improved mechanism of the class described capable of meeting the objects above set forth. While I have illustrated and described particular embodiments, various modifications may obviously be made without departing from the true spirit and scope of the invention intended to be defined by the appended claims.

I claim:
1. Filter mechanism comprising a tubular arrangement made up of a group of coaxial helical elements of equal helical diameters and of a resilient form maintaining material and each set with relative permanence in a helix having an opening between turns and of equal pitch length of several times the diameter of each helix where- by the elements may be assembled into and out of continuous contiguous side-by-side coaxial relation.

2. Filter mechanism as in claim 1 further characterized by there being a filter material coaxially arranged within the group of coaxial helical elements with the outer diameter of the filter material being at least as great as the inner diameter of the permanent set of the helical elements.

3. Filter mechanism as in claim 2 further characterized by there being a rigid tube having a fluid pervious cylindrical wall coaxially arranged within the filter material.

4. Filter mechanism as in claim 3 further characterized by the rigid tube being another group of coaxial helical elements of equal helical diameters in the particular group and of resilient form maintaining material and each set with relative permanence in a helix having an opening between turns and for the group each of equal pitch length of several times the diameter of the helix whereby the elements may be assembled in continuous contiguous side-by-side coaxial relation.

5. Filter mechanism as in claim 4 further characterized by the direction of helical lay of the elements of the first group being the reverse of the direction of helical lay of the elements of the inner group forming the fluid pervious wall tube within the filter material.

6. Filter mechanism as in claim 2 further characterized by the helical elements each having its surface knurled whereby to create radial slots between said elements.

7. A strainer tube comprising an inner foraminous tube, filter material thereabout, and an outer tube comprising a plurality of form maintaining resilient material elements around said filter material, said elements having the characteristics of each being a separate helix having an opening between turns and having equal pitch of more than twice the diameter of the helix and having an inner helical diameter less than the outer diameter of the filter material and capable of elastic deformation for application to and removal from the side of said filter material in the field whereby to provide for ease of reassembly and whereby the longitudinal components of forces exerted by the elements on the filter material will exceed the radial or hoop effect of the elements.

8. A strainer tube as in claim 7 further characterized by pipe fittings at each end of the tube and clamp means holding said pipe fittings with respect to the form maintaining helical elements.

References Cited in the file of this patent

UNITED STATES PATENTS

| | | |
|---|---|---|
| 408,487 | Jewell | Aug. 6, 1889 |
| 911,682 | Scheunert | Feb. 9, 1909 |
| 2,197,971 | Elze | Apr. 23, 1940 |
| 2,342,669 | Hoffman | Feb. 29, 1944 |
| 2,754,005 | Tursky | July 10, 1956 |
| 2,768,751 | Booth | Oct. 30, 1956 |